UNITED STATES PATENT OFFICE.

JEAN J. E. LENOIR, OF PARIS, FRANCE.

IMPROVEMENT IN PROCESSES FOR PRODUCING AMALGAMATED SILVERING FOR MIRRORS.

Specification forming part of Letters Patent No. 166,790, dated August 17, 1875; application filed August 9, 1875.

*To all whom it may concern:*

Be it known that I, JEAN JOSEPH ETIENNE LENOIR, engineer, of Paris, France, have invented a new Process for Producing Amalgamated Silvering for Mirrors, of which the following is a specification:

Since the introduction of the new process for silvering mirrors by chemical means the old process of coating them with amalgamated tin-foil has fallen into disuse. The process was unhealthy to the workmen, more expensive in its application, and the tin amalgam was liable to liquate and become dull or cracked. On the other hand, however, the present system of silvering by chemical means does not produce mirrors possessing all the brightness and brilliancy of those produced by tin. amalgamation. The silver film has always a more or less yellowish tinge, and the discoloration is liable to increase with age.

The object of my invention is to amalgamate the silver film by chemical means, and I thus produce more perfect adherence of the silver to the glass, and notably increase the brilliancy of the mirror-surface and the purity of its color.

The process is as follows: The plate of glass is coated with silver by any one of the known methods. This being done, the surface may be washed free from all deposit by being flushed with water. I now pour onto the silvered surface a solution of a salt of mercury. Many of the salts of mercury answer more or less. Thus oxide of mercury, oxalate, chloride, subchloride, and many others will answer if they are dissolved in a solution which is of a nature to clean and dissolve away from the silver surface the deposit produced by the decomposition of the mercurial salt; but, of all solutions, that which I prefer is one where a salt of mercury is dissolved in cyanide of potassium, and notably where a double cyanide of mercury and potassium has been formed by dissolving cyanide of mercury in cyanide of potassium. Example: take cyanide of mercury, eight hundred parts; cyanide of potassium, (commercial,) two hundred and fifty parts; water, five thousand parts. Mix, dissolve, and filter the solution. This solution may be diluted with about ten times its volume for use. As soon as it is poured onto the silvered surface the latter whitens and becomes amalgamated, and the mirror-surface against the glass takes all the brilliancy of the old amalgamated tinned mirrors. The color improves on keeping, as the film becomes more completely penetrated by the mercury. The solution should only remain on the glass for about two or three seconds, and then be poured off, as otherwise the precipitation of mercury may be too great, and the film may become disintegrated and lose its brilliancy. The solution being now removed the film is to be well washed with cold water, and the plate is placed in a vertical position to drip and become dry, when it may be varnished and painted at the back, as usual. This process may, of course, be applied to any silvered mirror-surface where chemical silvering has been applied.

I claim—

The process of amalgamating the silver films of mirror-surfaces by the application thereto of solutions of mercurial salts, substantially in the manner described, for the purpose of improving the color and increasing the durability of such mirror-surfaces.

In testimony whereof I have signed my name to this specification in the presence of two subscribing witnesses.

JEAN JOSEPH ETIENNE LENOIR.

Witnesses:
EMILE RICHARD,
ROBT. M. HOOPER.